United States Patent [19]

Lydersen

[11] Patent Number: 4,565,634
[45] Date of Patent: Jan. 21, 1986

[54] METHOD FOR THE REMOVAL OF OXYGEN FROM WATER

[75] Inventor: Aksel Lydersen, Trondheim, Norway

[73] Assignee: Sintef, Trondheim, Norway

[21] Appl. No.: 557,229

[22] Filed: Nov. 30, 1983

[30] Foreign Application Priority Data

Dec. 28, 1982 [NO] Norway .................................. 824395

[51] Int. Cl.⁴ .............................................. B01D 19/00
[52] U.S. Cl. ........................................ 210/718; 55/55;
210/750; 261/96
[58] Field of Search ................... 55/38, 41, 44, 53, 55,
55/57, 189, 190, 194, 196; 210/150, 151, 188,
194, 195.1, 199, 220, 221.1, 221.2, 262, 718, 750;
261/96

[56] References Cited

U.S. PATENT DOCUMENTS

| | | | |
|---|---|---|---|
| 2,764,533 | 9/1956 | Oetjen et al. | 55/55 |
| 3,815,330 | 6/1974 | Lauley | 55/196 |
| 4,153,556 | 5/1979 | Riedinger | 210/750 |
| 4,370,151 | 1/1983 | Herbrechtsmeier | 210/220 |

OTHER PUBLICATIONS

"How Conoco Floods with Seawater", Charles M. Hudgins, Jr. and R. T. Hanson, *The Oil and Gas Journal*, pp. 71–77, Feb. 15, 1971.
"Efficient Removal of Oxygen in a Waterflood by Vacuum Deaeration", Wallace J. Frank, *American Institute of Mining, Metallurgical and Petroleum Engineers, Inc.*, Paper No. SPE 4064, pp. 1–5, 1972.
"The Forties Field Sea-Water Injection System", R. W. Mitchell, Society of Petroleum Engineers of AIME, pp. 877–884, Jun. 1978.
"How to Vacuum Deaerate Injection Water", James McGill, The Oil and Gas Journal, pp. 81–84, Oct. 1, 1973.

*Primary Examiner*—Richard V. Fisher
*Assistant Examiner*—W. Gary Jones
*Attorney, Agent, or Firm*—Wenderoth, Lind & Ponack

[57] ABSTRACT

Water intended for injection into an oil reservoir is freed from oxygen by gravitating the water through a vacuum tower. Gases liberated from the water by the vacuum process are drawn off at the bottom of the respective stages of the tower. Liberated nitrogen at the top of each stage will then flow down through the tower in cocurrent flow with the water and thus act as an internal stripping gas reducing the partial pressure of oxygen in the gaseous phase. Gases and vapors drawn off from the bottom of each vacuum stage after the first stage are pressurized to the pressure of the preceeding stage and reinjected into that stage.

5 Claims, 1 Drawing Figure

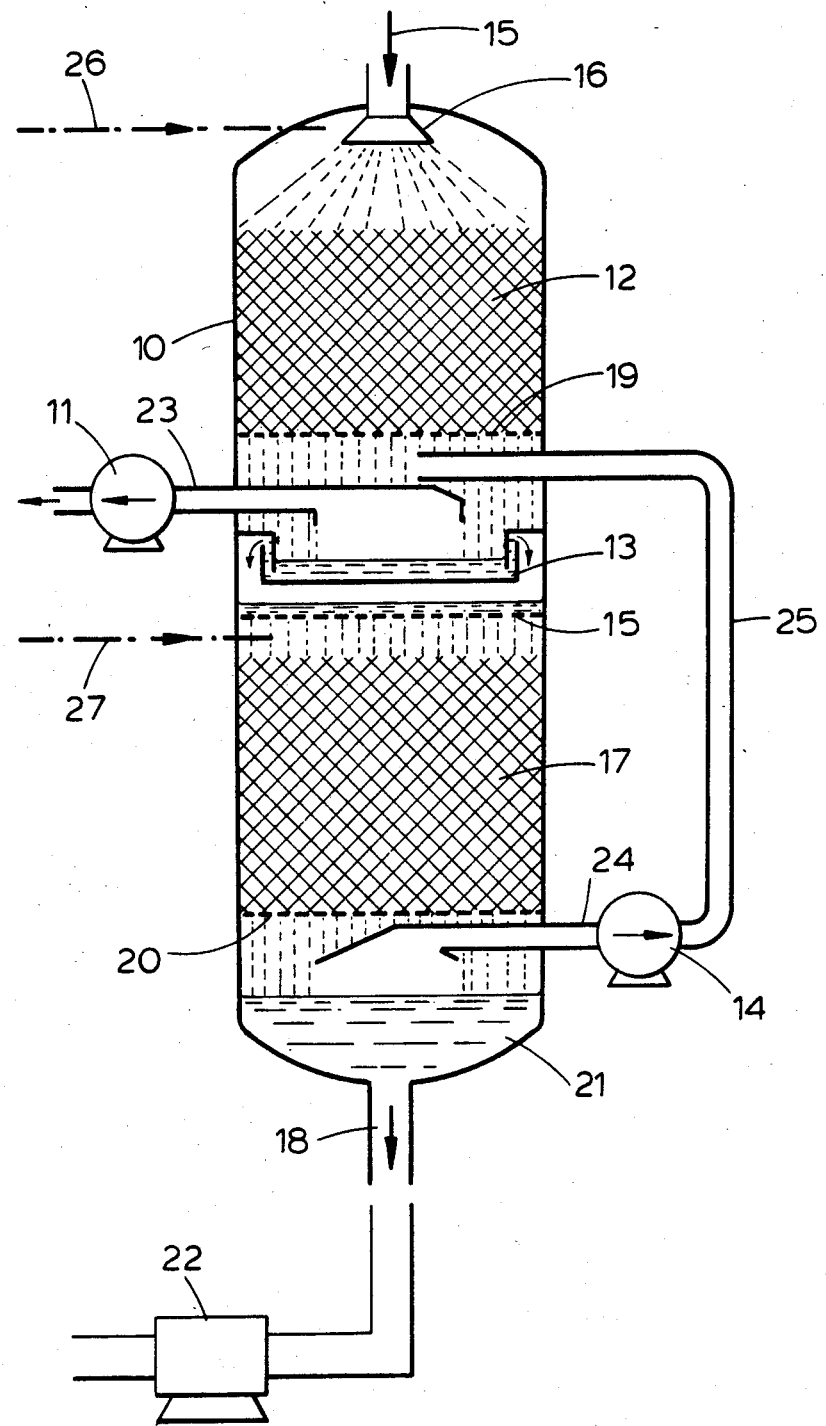

METHOD FOR THE REMOVAL OF OXYGEN FROM WATER

BACKGROUND OF THE INVENTION

The present invention relates to an improved method and apparatus for removing oxygen from water, particularly injection water used in waterflooding oil reservoirs.

Fresh water as well as sea water generally contains between 7 and 14 ppm dissolved oxygen. When such water is used in waterflooding an oil reservoir the oxygen therein will cause corrosion of metallic parts exposed to high pressure and it may also promote bacteria growth clogging the pores of the reservoir. These are the main reasons why the oxygen content of such injection water is normally reduced to less than 0.05 ppm before the water is pumped to higher pressures. The oxygen removal generally takes place in at least two stages. The first stage could be a vacuum tower in which oxygen is stripped from water passing down through a packing material in countercurrent flow to a stripping gas which is introduced at the bottom of the tower and drawn off at the top thereof. The next stage of the process could be a chemical scavenging procedure such as treating with ammonium bisulphite to bind the oxygen. Descriptions of such apparatus are given inter alia by W. J. Frank (SPE Paper No. 4064, 1972) for a fresh-water installation at Seminole, Texas, and by R. W. Mitchell (J. Petr. Techn., June 1978, page 877-884) for seawater at the Forties field in The North Sea. The apparatus described by Frank uses 0.75 mol natural gas per $m^3$ water as stripping gas. The Forties field uses a $CO_2$-containing stripping gas that seems to promote corrosion when the oxygen content drops below 0.1 ppm.

It is also possible to remove oxygen under vacuum without the use of a stripping gas, thus permitting a smaller diameter degassing tower and eliminating the need for drawing off and compressing to atmospheric pressure of a gas quantity much larger than the gas quantity liberated from the water. On the other hand, oxygen removal is less effective without the use of a stripping gas, necessitating a lower pressure and more vacuum stages in the degassing tower in order to reach the desired reduction of the oxygen content. This in turn, implies an undesirably high pressure ratio between the atmosphere and the lowest vacuum stage.

Removal of oxygen under vacuum without the use of a stripping gas is discussed for instance by J. McGill (Oil and Gas J., Oct. 1, 1973, p. 81-84) and by C. M. Hudgins and R. T. Hanson (Oil and Gas J., Feb. 15, 1971, p. 71-77). The latter publication is concerned with the installations at the San Miguelito field near Ventura, California, where seawater is used as injection water. The vacuum tower has a diameter of appr. 2.1 m and has three stages, each having 2.44 m of packing and a seal between the stages. Liberated gases and water vapour are drawn off from the top of each stage and compressed to atmospheric pressure. However, as also pointed out in the above McGill article, there are two rather important drawbacks associated with a such procedure. One is the above mentioned high pressure ratio requiring the gases to be compressed from the lowest stage up to atmospheric pressure. Thus, in order to obtain 0.1 ppm of oxygen from the last stage when deaerating water at 60° F. (16° C.) he contemplates a pressure ratio of 44. This places extra high demands on the compressors drawing gas from stages after the first stage and also requires a high energy consumption. The other drawback is uncertainty of degassing toward the bottom of the tower where the vapour rate goes to zero.

SUMMARY OF THE INVENTION

The method according to the invention is one in which the water to be treated is introduced at the top of a degassing tower having one or more vacuum stages, and the deaerated water is removed from the bottom of the tower, while gases liberated from the water passing down the tower are drawn off from the respective stages.

According to the invention gases liberated in the vacuum process are drawn off near the bottom of each vacuum stage instead of at the top, as is conventional. By this unique feature liberated nitrogen at the top of each stage may be used as a stripping gas for oxygen removal since the nitrogen will flow down through the degassing tower in cocurrent flow with the water and while doing so will reduce the partial pressure of the oxygen in the gaseous phase, thereby enhancing the driving force that causes the transfer of oxygen from the aqueous phase to the gaseous phase. The result is a more effective oxygen removal than has been possible through conventional methods and apparatus, without the use of a separate stripping gas, and this is obtained without the above described drawbacks of such prior techniques.

In a preferred embodiment of the invention the gases drawn off from each stage are fed back to the bottom of each preceeding stage, resulting in a reduction by a factor of ten or more of the pressure ratio across the compressor relative to the ratio required when compressing to atmospheric pressure. In addition, the water vapour, which represents the major part of the gas from a lower stage, will condense upon contact with the water of the preceeding stage. As a result the water vapour from a lower stage does not represent an additional load on the compressor drawing off gases from the preceeding stage.

BRIEF DESCRIPTION OF THE DRAWING

The invention will be better understood from the following detailed description of a preferred embodiment thereof and with reference to the accompanying drawing which schematically illustrates an apparatus according to the invention for the degassing of water.

DETAILED DESCRIPTION OF THE INVENTION

In the drawing 10 is a two-stage vacuum tower constructed according to the teachings of the present invention. The water to be treated enters through an inlet 15 at the top of the tower and a spray nozzle 16 distributes the water uniformly over packing 12 resting on a support screen 19. Spaced below the screen 19 is a gas confinement means shown in the form of a water seal 13 forming the lower termination of the upper or first stage of the vacuum tower and securing the pressure difference between that stage and the underlying second stage of the tower 10. The water flows from the water seal 13 down onto a screen 15 and thence evenly over packing 17 resting on a support screen 20 spaced above the bottom of tower 10. The degassed water then accumulates in the bottom of the tower in which it forms a gas confinement means or water seal 21 terminating the second or last stage of the vacuum process until it discharges through an outlet pipe 18 to a transfer pump 22 conveying the water to storage or consumption, e.g. as injection water in an oil reservoir.

In accordance with conventional practice the elevation of the vacuum tower 10 is such that the height of the water column in the outlet pipe 18 and bottom of tower 10 outbalance the negative pressure in the last vacuum stage.

The packing 12, 17, serving to impart a maximum surface to the water while exposed to the negative pressure of the vacuum stages, may, as in conventional apparatus, consist of for instance Pall-rings or plastic Intalox-saddles.

According to the invention, near the bottom of the first stage, more pariculary in the space between the packing 12 and water seal 13, there is an outlet suction means 23, communicating with a vacuum pump 11, drawing off gas and vapours released in the first stage of the process. A similar outlet suction means 24 and vacuum pump 14 are disposed near the bottom of the second stage in the space between the packing support 20 and water seal 21 for drawing off liberated gases and water vapour in that stage.

The invention is based on the fact that the quantity on a mole basis of nitrogen dissolved in fresh water as well as in sea water in contact with the atmosphere is almost twice as high as the quantity of oxygen, and on the fact that the constant H in Henry's law ($P = HX$, where P is the partial pressure of the gas and X is the mole fraction of the gas in the liquid) for nitrogen in fresh water is about 2 times and for nitrogen in sea water about 2.2 times as high as the Henry's law constant for oxygen. For these reasons most of the gases liberated at the top of the water degassing tower 10 will be nitrogen. Then, since the gas suction means 23, 24 are located at the bottom of the vacuum stages as described above and shown in the drawings, instead of at the top of each stage as is conventional, the liberated nitrogen at the top of each stage will pass in cocurrent flow with the water down through the packing and act as an internal stripping gas thus reducing the partial pressure of oxygen in the gaseous phase. The result is a substantially more effective removal of the oxygen in the water, particularly in the first stage, than would be possible using vacuum alone, as can be seen from the subsequent calculation example.

When the water flows from one stage to the next an evaporation occurs owing to the fall in pressure. That is, evaporation takes place at or immediately after the water seal 13. By drawing off the vapour also at the bottom of the tower such as illustrated in the drawing, a satisfactory vapour rate is secured also in the lower part of the packing 17 in the last stage.

According to another aspect of the present invention the gases and vapour produced in a stage after the first stage of the vacuum process are compressed only to the pressure prevailing in the preceeding stage and reinjected into the latter stage at the bottom thereof, to contact the water therein. In the example shown in the drawing, in which the vacuum tower comprises two stages, this aspect is indicated by a conduit 25 leading from the vacuum pump 14 at the bottom of the last stage to the bottom of the first stage, in the space above the water seal 13 and preferably above the suction means 23.

The result is a more moderate compression ratio between the pressure side and the suction side of the pump 14, while also most of the water vapour in the vapour-gas mixture from the last stage is condensed in the water of the preceeding stage. Through this arrangement the demands made on the vacuum pump of the last stage will be far less than in conventional devices requiring compression up to atmospheric pressure, without causing any significant increase in the load on the vacuum pump of the preceeding stage.

While utilization of the process and apparatus according to the invention as described above is contemplated primarily without the use of external stripping gas, there is nothing to prevent the use of some separate stripping gas in addition. In such case it should be added at the top of one or more of the vacuum stages, i.e. above the spray 16 in the first stage and/or above the packing 17 in the second stage as indicated by stippled lines 26, 27 in the example shown.

Such externally added stripping gas could be natural gas, for example, like in a conventional stripping apparatus. In stages after the first stage air may also be used as a stripping gas. Besides being more economic, the use of air as a stripping gas has the advantage of being permitted to discharge from compression to atmospheric pressure directly into to the surroundings.

While the invention has been disclosed in connection with a two-stage vacuum tower as a preferred embodiment, it could of course include three or more stages. In such case a water seal, similar to the water seal 13 between the first and second stage in the example shown, would be arranged at the bottom of the second stage and each subsequent stage except the last one, and preferably also a feed back conduit like the conduit 25 of the example shown, would be arranged to extend from the bottom of each stage to the bottom of the preceeding stage.

The use of a single stage tower is also conceivable within the scope of the invention, although this would mean elimination of the additional effect provided by the gas feed back between the stages of a multi-stage tower.

The following calculated example, which is based on the measuring of mass transfer coefficients in a tower with Pall-rings used as a packing, will further illustrate the invention.

EXAMPLE

The table below gives calculated data for desorption of oxygen from sea water in two-stage desorption towers operating under vacuum and without the use of a separate stripping gas. Column 1 gives data for a tower with cocurrent flow of water and liberated gas according to the present invention, and column 2 refers to the conventional arrangement with countercurrent flow of water and gas. The calculations are based on the following data and assumptions:

The sea water to the first stage is at temperature 12° C. and contains 8.0 ppm oxygen and 12.1 ppm nitrogen. Henry's law constant for nitrogen in sea water at 12° C. is assumed to be $9.88 \times 10^9$ Pa/mole fraction and for oxygen $4.53 \times 10^9$ Pa/mole fraction, and the mass transfer coefficient for nitrogen is assumed to be 1.2 times the mass transfer coefficient for oxygen. In addition, based on laboratory data with a tower with a spray as water distributor in the first stage, a packing of 25 mm diameter Pall rings and liquid load 140 m$^3$ per hour and per m$^2$ cross-section of the tower, the spray is assumed to correspond to NTU=0.9 transfer unit and the height of one transfer unit in the packing, HTU=0.8 m.

TABLE

Two-stage degassing of sea water. Column 1 refers to the present invention with cocurrent flow and column 2 the conventional arrangement with countercurrent flow of water and liberated gas.

| Column<br>Type of flow | 1<br>Cocurrent | 2<br>Countercurrent |
|---|---|---|
| Stage 1, pressure, mm Hg | 40.0 | 40.0 |
| Stage 2, pressure, mm Hg | 12.2 | 12.2 |
| Oxygen in water from stage 1, ppm | 0.64 | 0.71 |
| Oxygen in water from stage 2, ppm | 0.04 | 0.04 |
| Stage 1, NTU | 4.39 | 6.75 |
| Stage 2, NTU | 3.69 | 4.73 |
| Stage 1, height of packing, m | 2.79 | 4.68 |
| Stage 2, height of packing, m | 2.95 | 3.78 |
| Both stages, height of packing, m | 5.74 | 8.46 |

Assuming that the spray over the first stage corresponds to NTU=0.9 and no such effect from the water distributor in the second stage, the last line in the table shows that the oxygen content 0.04 ppm in the water from the second stage is obtained with the present invention with only 68% of the height of packing needed by the conventional countercurrent flow. Additionally, packed towers with cocurrent flow may be operated with a higher liquid load than towers with countercurrent flow.

In the table, the total pressure is assumed to be constant throughout each stage of the tower. With cocurrent flow, the lowest total pressure will be in the lower part of the packing, while in countercurrent flow, the total pressure will be highest in the lower part of the packing. The result of this will be that the cocurrent flow gives a higher driving force at the lower part of the packing which is the most critical and thus giving an additional advantage to the present invention.

What I claim is:

1. A method for removing oxygen from water, said method comprising:

providing a vacuum tower having therein at least one stage including a packing;

introducing water containing oxygen and nitrogen into the top of said tower and passing said water downwardly through said packing;

maintaining said stage under a vacuum, thereby liberating oxygen and water vapor from said water during downward passage thereof through said packing, and thereby liberating nitrogen from said water at the top of said stage;

drawing off from the bottom only of said stage a mixture of liberated gases and water vapor and thus separating said mixture from said water, thereby drawing said nitrogen released from said water at the top of said stage downwardly through said stage in cocurrent flow with said water, and causing said nitrogen to act as an internal stripping gas to facilitate removal of said oxygen from said water, until said nitrogen is drawn off from said bottom only of said stage with said liberated oxygen and water vapor; and discharging from the bottom of said tower said water having oxygen liberated therefrom.

2. A method as claimed in claim 1, comprising providing said tower with plural vertically spaced said stages, each said stage having a respective said packing, passing said water downwardly sequentially through said stages, and drawing off said mixture from the bottom of each said stage.

3. A method as claimed in claim 2, further comprising compressing said mixture drawn off from the bottom of each said stage except the uppermost said stage to a pressure corresponding to the pressure prevailing in the respective preceeding stage, and reinjecting said mixture into the bottom of said respective preceeding stage.

4. A method as claimed in claim 1, further comprising adding air as a separate stripping gas to the top of said stage.

5. A method as claimed in claim 1, comprising drawing off said mixture at a position below said packing in said stage.

* * * * *